United States Patent [19]

Rickard et al.

[11] Patent Number: 5,977,650
[45] Date of Patent: Nov. 2, 1999

[54] TRANSMITTING COMMUNICATIONS SIGNALS OVER A POWER LINE NETWORK

[75] Inventors: Robin Paul Rickard, Herts; Matthew Grant Fradley, Old Harlow, both of United Kingdom

[73] Assignee: Northern Telecom Limited, Montreal, Canada

[21] Appl. No.: 09/114,779

[22] Filed: Jul. 13, 1998

[30] Foreign Application Priority Data

Mar. 17, 1998 [GB] United Kingdom ............... 9805763

[51] Int. Cl.[6] .................................................. H02J 3/02
[52] U.S. Cl. ................... 307/3; 340/310.01; 340/310.06
[58] Field of Search .......................... 307/3; 340/310.01, 340/310.06

[56] References Cited

U.S. PATENT DOCUMENTS 4,473,817  9/1984  Perkins .......................................... 307/3
5,828,293  10/1998  Rickard .............................. 340/310.04

FOREIGN PATENT DOCUMENTS

2180381 A  3/1987  United Kingdom .
WO98/06188 A1  2/1998  WIPO .

*Primary Examiner*—Jeffrey Gaffin
*Assistant Examiner*—Roberto J Rios
*Attorney, Agent, or Firm*—Lee, Mann, Smith, McWilliams, Sweeney & Ohlson

[57] ABSTRACT

Communications signals are transmitted over a power distribution network. A plurality of communications stations which are coupled to the power lines are served by a base station. Communications signals are coupled between the base station and the distribution network, and the flow of the communications signals is controlled according to the station that it is desired to communicate with by preferentially transmitting along or receiving from a power line to which the desired communications station is coupled. The base station can be coupled to each of the power lines or to the busbars at a distribution station.

11 Claims, 12 Drawing Sheets

Fig. 13

TRANSMITTING COMMUNICATIONS SIGNALS OVER A POWER LINE NETWORK

TECHNICAL FIELD

This invention relates to an apparatus and method for transmitting communications signals over a power line.

BACKGROUND OF THE INVENTION

It has been proposed to transport telecommunications signals over a power line. International Patent Application WO 98/06188 A1 (Northern Telecom) describes such a network. Delivering a telecommunications service in this manner is attractive as it overcomes the need for installing cabling to each subscriber, which is one of the greatest costs in providing a new telecommunications network. Existing power lines are used to carry the telecommunications signals to subscribers.

Power line transmission is one of several ways for delivering communications to subscriber premises and is therefore sensitive to competition with existing copper wires and more recent alternatives such as optical fibre/coaxial cable delivery and fixed radio access techniques. Therefore, there is a desire to provide a system that is capable of delivering an acceptable quality of service at a cost that is attractive to a subscriber.

In the above-mentioned WO 98/06188 A1 communications signals are injected onto one or more of the power lines leading from an electricity substation at a position on the line near to the substation.

SUMMARY OF THE INVENTION

The present invention seeks to provide an improved way of coupling communications signals on to a power line distribution network.

A first aspect of the present invention provides a method of transmitting communications signals over a power distribution network comprising a distribution station having a plurality of power lines leading from it for distributing electricity, and a plurality of communications stations coupled to respective power lines, there also being a base station for serving the plurality of communications stations, the method comprising:

coupling communications signals between the base station and the distribution network, and controlling flow of the communications signals according to the station that it is desired to communicate with by preferentially coupling with a power line to which the desired communications station is coupled.

A further aspect of the invention provides an apparatus for performing this method.

In one embodiment, each of the power lines has means for coupling communications signals onto the line and the step of controlling flow of communications signals comprises selecting which of the coupling means are used. The selecting can be made by one or more switching devices in the paths leading to the coupling units. This arrangement requires less transmit power compared to an arrangement where a base station is permanently coupled to all of the lines since the base station transmitter only needs to apply transmit power to one of the lines at any time. This also serves to minimise radiated power from the network. In the upstream path it has the advantage that the base station receiver only receives signals from one of the lines, i.e. the line to which the desired station is coupled. This reduces the amount of noise reaching the receiver from other lines and therefore increases the signal-to-noise ratio of the received signal at the receiver.

In a second embodiment communications signals are coupled onto the network at busbars of the distribution station at first and second spaced apart points on the busbars and the signals that are applied to one of the points on the conductor are modified with respect to the signals that are applied to the other point whereby to control the combined power that is delivered to the lines, and the modifying is controlled so as to preferentially transmit along a power line to which the desired station is located. The term "at the busbars" includes coupling signals directly on to the busbars and at a position directly adjacent to them.

Coupling communications signals to the line at the busbars allows a large number of subscribers to be served in a cost-effective way. This avoids the need to make connections to the power lines at other positions where there will be the additional time and expense of excavating to locate the power lines and to provide a housing for the coupling equipment. There are a number of different ways in which the coupling can be achieved.

There may be two or more connection points to each busbar. The connection point can be on the busbar itself or to a power line leading from the busbar. The connection can be achieved by a number of different methods, such as by physically contacting the busbar by clamping a connector around the busbar, or by replacing a fuse unit in the one of the power lines leading from the busbar by a replacement fuse unit having a coupling device incorporated into it. A suitable replacement fuse unit is described in International Patent Application PCT/GB 98/00173.

The connection points are fed by signals which differ from one another in terms of their relative amplitude and/or phase. In this manner it is possible to preferentially transmit along a particular one of the power lines by arranging the combined signal power from the connection points to be greater along a particular one of the lines so as to preferentially transmit along a power line to which a wanted subscriber is coupled. The weighting of signals can be changed according to the subscriber that it is required to communicate with. This minimises signal power (and hence radiated power) from parts of the network that it is not necessary to transmit along at that point in time.

The above technique can be applied to both the downstream (base station to subscriber) and upstream (subscriber to base station) directions of communication. When used in the upstream direction, it has the effect that the base station preferentially receives from a particular one of the power lines and thereby increases the signal-to-noise ratio of the wanted signal.

It will be appreciated that the above techniques are not limited to a base station which only serves a single subscriber at a time, but can also be used with a base station that serves two or more subscribers at any time.

A busbar array has a plurality of busbars, each serving a particular electrical phase. In order to communicate with subscribers on different phases, it is preferred to connect to the busbars of each phase line.

One of the potential problems with transporting RF signals over a power line is that of unwanted radiation of RF energy from the power line and other parts of the electricity distribution network. This is because the electricity distribution network was not designed to carry RF signals. One significant point where radiation can occur is at the substations where electricity is transformed from high voltage (eg 6.6 or 11 kV) to low voltage (400V). The busbars at the substation are typically mounted as a grid array on the substation wall and while they are shielded from view they are often electrically unscreened. This is because screening is considered unnecessary at the 50 Hz mains frequency. At RF frequencies the busbar array can function as an antenna, radiating the RF signals which it receives via the distribution cables into the surrounding area. This is undesirable as it can cause interference with equipment operating at these frequencies.

A further improvement is to couple the set of communications signals to the busbars with a phasor relationship such that radiation of communications signals from the power line is minimised. This allows communications signals to be coupled onto the power line at a higher power level while still maintaining the radiated power within a particular limit. Radiated power is a particular problem when the communications signals occupy frequency bands that are not specially allocated for power line communications and therefore where there could be an interference problem with other users. It has been found that an increase of some 10 or 20 dB in transmitted power level is possible with this technique compared with coupling a set of in-phase communications signals on to the conductors. This allows a base station to serve subscribers who are located further away from the base station, which maximises the coverage of the base station and minimises the number of additional base stations or repeaters which are needed. Preferably the phasor relationship of the communications signals is arranged such that the vectorial sum of the set of communications signals is substantially equal to zero. The set of communications signals may comprise two or more signals.

The set of communications signals can be derived in several ways. A first way comprises receiving an input communications signal, dividing the input signal into the set of communications signals and choosing the phasor relationship of the set of communications signals by phase-shifting at least one of the divided signals. The phase-shifting can be achieved by a suitable weighting device.

An alternative way comprises directly generating a set of communications signals, such as by direct digital synthesis, one for each conductor of the set of conductors, which generated signals have a phasor relationship such that radiation of communications signals from the power line is minimised. The generated signals are modulated according to an input communications signal which it is intended to transmit.

One or more of the set of communications signals may be scaled in amplitude. This has the advantage of coping with differential loading effects on the power line conductors.

Advantageously the method further comprises monitoring a quantity which is indicative of the success of the step of setting the phasor relationship of the communications signals such that radiation of the communications signals is minimised and varying the phasor relationship of the set of communications signals according to the monitored quantity. The monitored quantity can be radiation of communications signals from the power line or a quantity which is indicative of the loading of the conductors of the power line.

The phasor relationship of the set of communications signals can be varied by applying perturbations to phasor settings for one or more of the communications signals.

The network can comprise underground or overhead lines or a combination of these. Radiation of RF signals can be a particular problem with some types of overhead lines which do not have a co-axial like structure or benefit from the shielding of being buried underground.

The communications signals can be data packets carrying data for computer applications such as home working, file transfer, internet access and a wide range of other applications.

Preferred features may be combined as appropriate, and may be combined with any of the aspects of the invention as would be apparent to a person skilled in the art.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENTS

Figure 1:
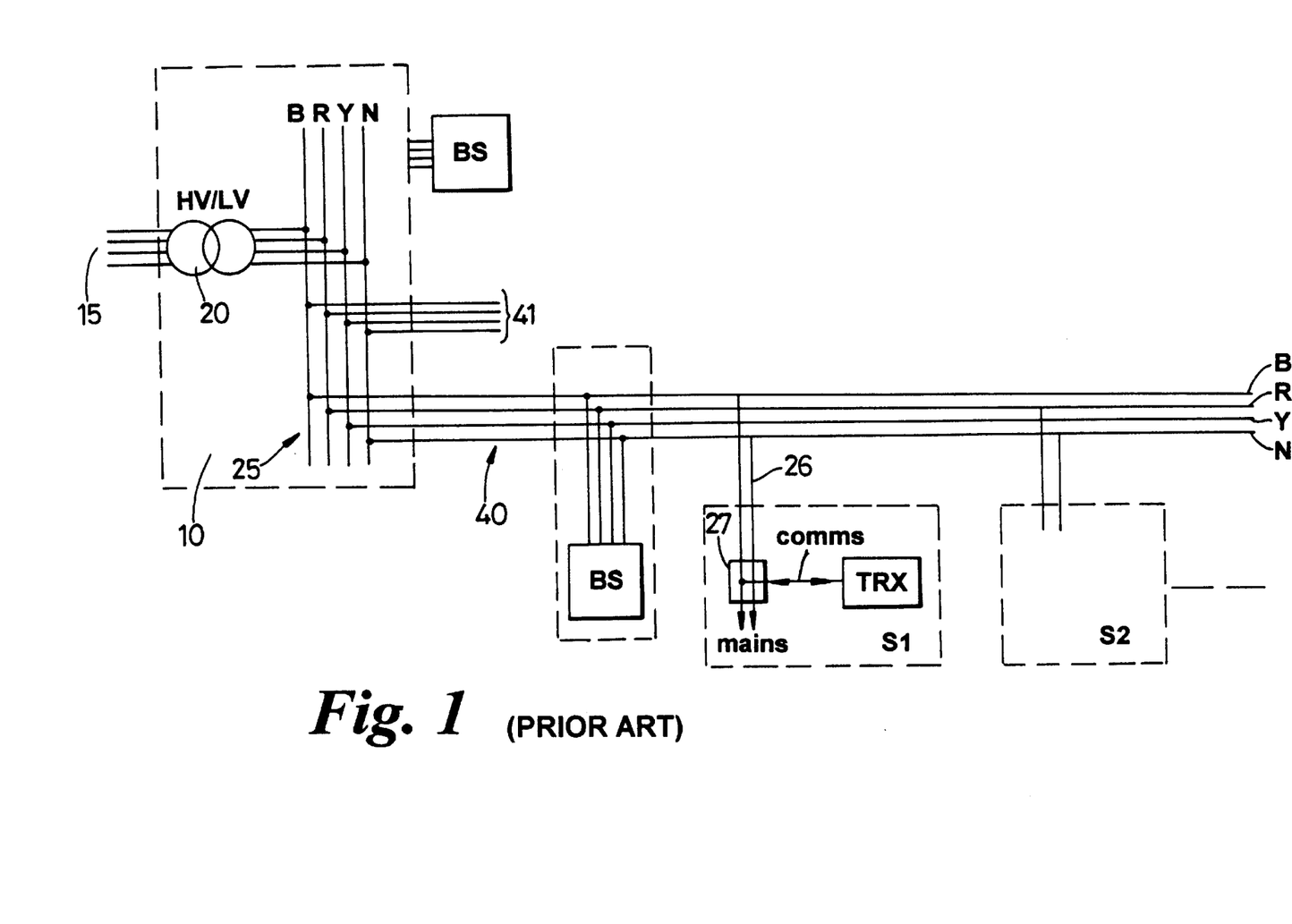
FIG. 1 shows an electricity distribution network which is adapted to carry telecommunications signals.

FIG. 1 shows an electricity distribution network which is adapted to carry telecommunications signals. Mains electricity enters the network from a high voltage 6.6 kV or 11 kV transmission line 15 and is transformed by transformer 20 at substation 10 into a 400V supply which is delivered via busbars 25 and distribution cable 40 to customer premises S1 and S2. A substation 10 typically has between 4 and 8 such distribution cables of the kind shown as 40, 41 leading from it, each distribution cable serving a number of subscriber premises. A distribution cable can extend for several hundreds of metres. Distribution cable 40 comprises a set of phase lines blue (B), red (R) and yellow (Y) and a neutral line (N) which are electrically insulated from one another. A full distribution network will usually include more of the premises shown as S1, S2 and will typically include a more elaborate tree-and-branch distribution network. Subscriber premises may receive a single phase electricity supply (230V) or a three-phase electricity supply (400V). Domestic subscriber premises usually receive a single-phase supply and neighbouring subscriber premises are usually coupled to different phase lines. In FIG. 1 subscriber S1 is shown coupled to the blue phase line and subscriber S2 is coupled to the red phase line. This helps to distribute the load of the network evenly across the three phases.

A base station BS couples communications signals, such as voice or data, onto the electricity distribution network. Communications signals propagate over the cables to transceiver stations TRX located at subscriber premises S1, S2. Subscriber premises coupled to one or more phase lines of distribution cable 40 by a branch line 26. A coupling unit 27 at the subscriber premises S1 couples communications signals to and from the branch cable 26 to serve transceiver unit TRX. In the upstream direction, communications signals are transmitted from the subscriber transceiver station TRX towards the base station BS. In one embodiment the communications signals from base station BS are coupled to the busbars 25 at substation 10, the busbars acting as a star point for serving all of the distribution cables 40, 41. In another embodiment the communications signals from base station BS are coupled onto each of the lines at a point along the power line from substation 10.

Communications transceiver stations TRX are located at various distances from the base station BS along lines 40, 41. The quality of communications experienced by these transceiver units depends on the signal to noise ratio (SNR) at the transceiver stations. Factors affecting the signal to noise ratio are:
(i) attenuation between the base station and transceiver unit;
(ii) noise level on the power line; and,
(iii) the power level at which the base station transmits.

Communications signals can be transmitted between a phase line and neutral or earth. Communications signals can be transmitted using a variety of line coding or modulation techniques, such as Frequency Shift Keying (FSK) modulation. Radio frequency (RF) carriers carry the communications information. Frequency bands in the range 1 to 30 MHz can be used, as these offer greater bandwidth for carrying communications signals, but it is also possible to use other frequencies. The bit rate of such signals can be as high as 1–2 Mbit/s.

Figure 2:
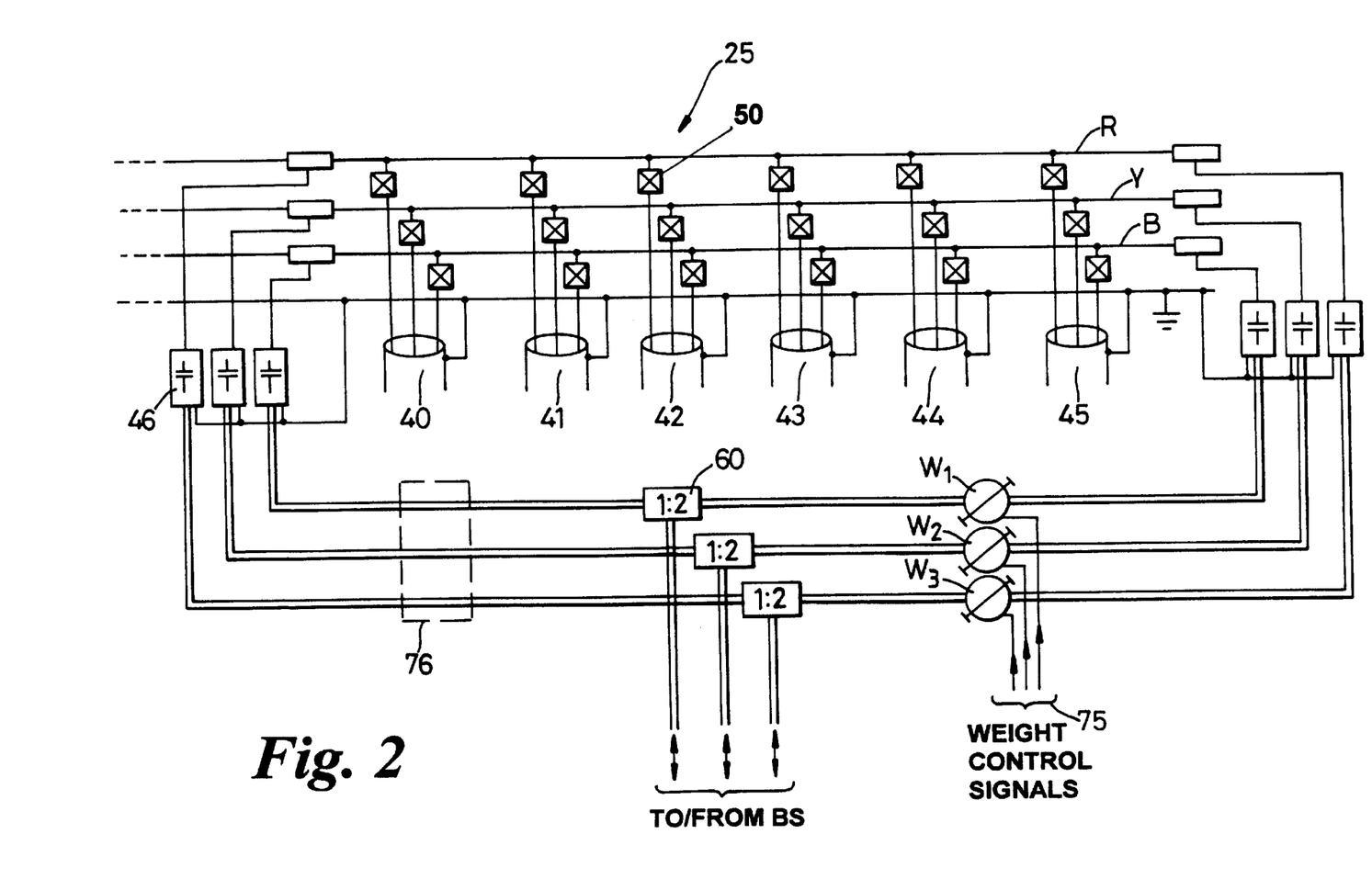
FIG. 2 shows one way of coupling to the busbar array of FIG. 1 in more detail.

A first way of coupling communications signals to the busbars is shown in FIG. 2. Communications signals from a base station pass through a coupling unit 46 which acts as a high-pass filter to allow communications signals to pass, and to block mains electricity. An output of each coupling unit 46 connects to a point on the busbar array 25. In FIG. 2 the communications signals are connected to the array near to a central position on each of the longitudinal conductors (R, Y, B) forming the array. The connection can be achieved by clamping an electrical connector directly to the busbar conductor, or, as shown in FIG. 2, by replacing a fuse in the distribution line 42, the fuse being adjacent to the busbar conductor. The replacement fuse unit 50 includes means for coupling communications signals to/from the power line 42. A suitable fuse is described in more detail in International Patent Application PCT/GB 98/00173. Communications signals injected at fuse 50 propagate along line 42 and also propagate in both directions along line R to other distribution lines 40, 41, 43, 44, 45. Communications signals are injected onto each of the phase lines Y, B in a similar manner to that just described for line R.

Each busbar conductor (R, Y, B) is fed at two points. Communications signals from base station BS are split into two portions by a 3 dB splitter 60 and each portion is applied to a respective end of a conductor. The two portions can be injected at other positions along the array, but it has been found that injecting at the ends provides best performance. Also, cables can be routed to avoid the distribution frame for increased safety. The signals can be injected in series with the ends of the busbar conductors, as shown in FIG. 2, or, as shown in FIG. 3, by using replacement fuse units 57, 58 in lines 40, 45.

Figure 3:
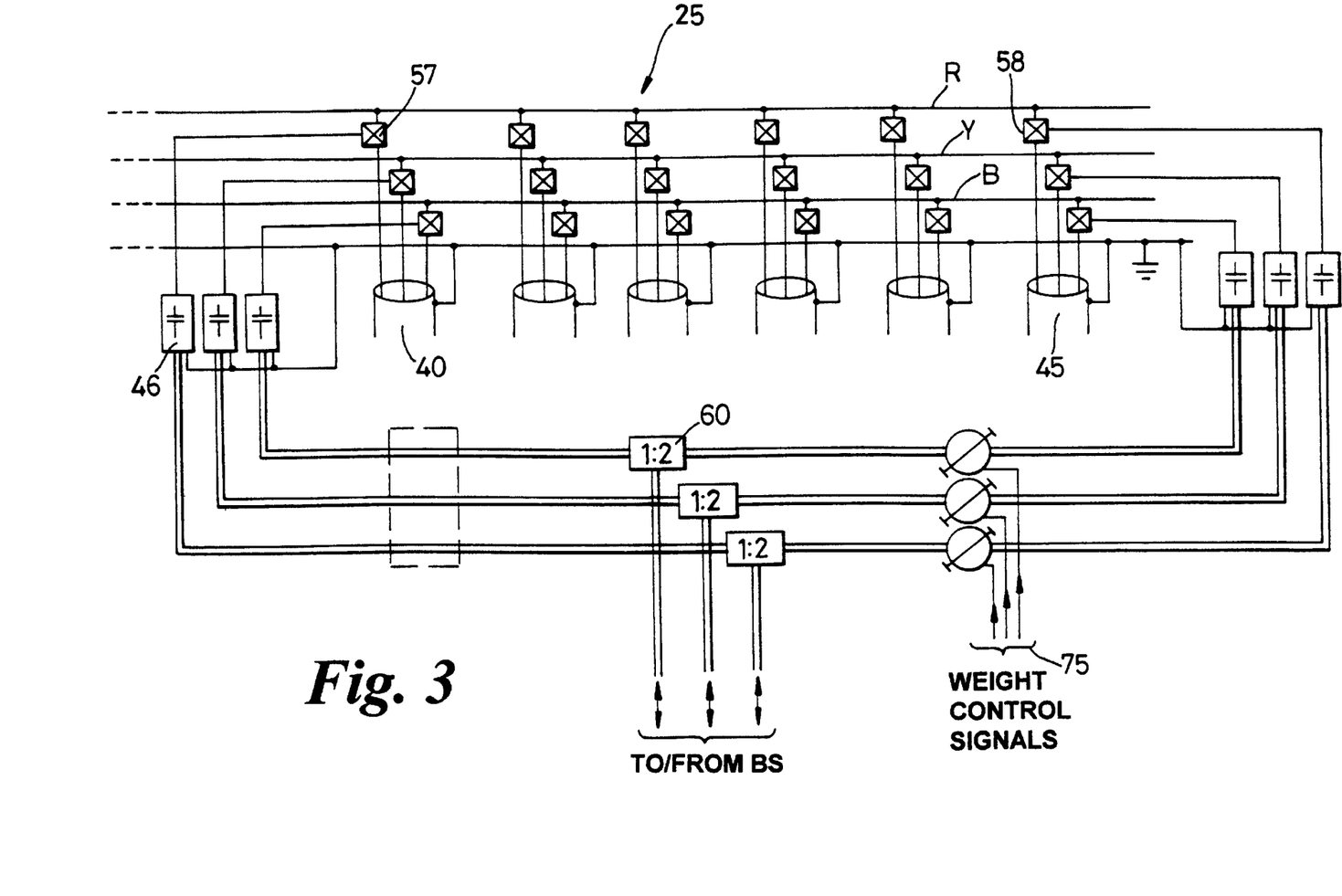
FIG. 3 shows an alternative way of coupling to the busbar array of FIG. 1.
Figure 4:
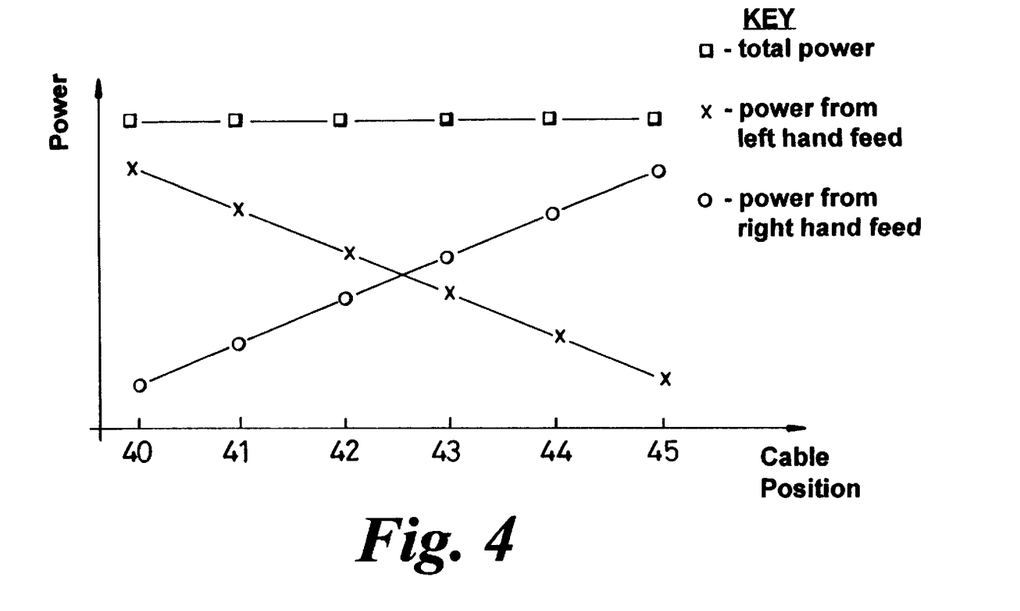
FIG. 4 shows distribution of signal power to power lines which is possible using the arrangement of FIGS. 2 and 3.

FIG. 4 is a graph showing the effect of coupling signals to the busbars using the arrangements of FIGS. 2 and 3. The graph shows power against position along the longitudinal busbar array. The power contributed by the left-hand injection point falls towards the right-hand side of the array whereas the power contributed by the right-hand injection point falls towards the left-hand side of the array. The variation in power need not be linear, as shown here. The total power contributed by both injection points is fairly constant across the full length of the array.

Referring again to FIGS. 2 and 3, one of the paths between splitter 60 and the connection point to the busbar is modified with respect to the other path by a set of complex weights $W_1, W_2, W_3$, one weight per path. Each weight can modify the amplitude and/or phase of the signal in that path. Weighting the signals in one of the paths has the effect of modifying the distribution of combined signal power across the busbar array. In this way it is possible to arrange the power along a particular one of the lines 40, 41, 42, 43, 44, 45 to be maximised.

The weight values are controlled by weight control signals 75. While FIG. 2 shows weights in only one of the two paths, it is possible to use a further set of weights in the other path, such as at position 76.

It will be appreciated that an alternative to the arrangement shown in FIG. 2 is to provide a single communications signal from base station BS, to split this into two paths by a splitter 60, to apply weighting to one or both of the split paths and then to divide this weighted signal into three parts, one for each of the phase lines, thereby reducing the number of weights.

Figure 5:
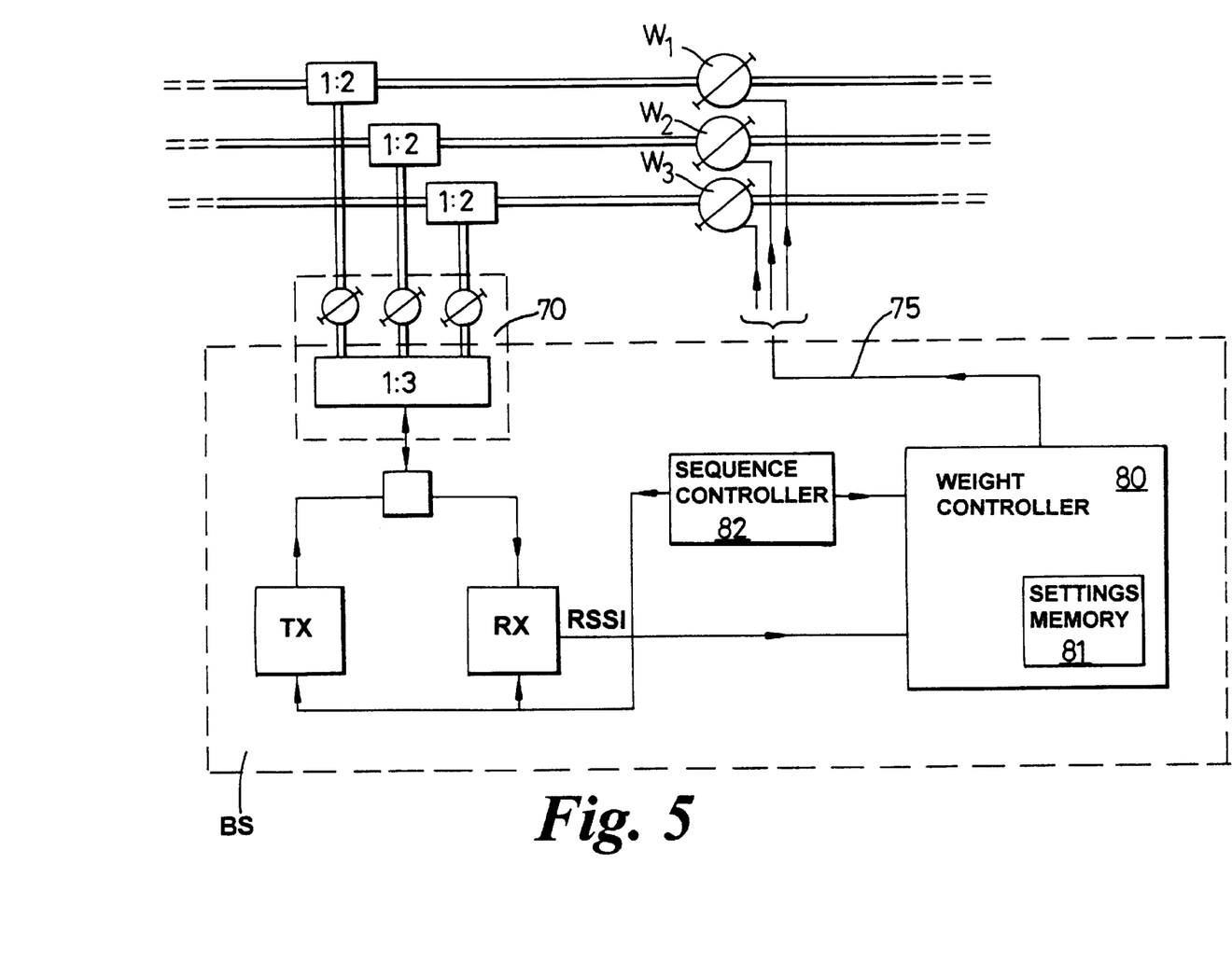
FIG. 5 shows a way of controlling the arrangement of FIGS. 2 and 3.

FIG. 5 shows one way of controlling the values of weights $W_1, W_2, W_3$. A weight controller 80 has an associated memory 81 which stores weight values. Values may be associated with a particular subscriber, distribution line (40, 41, . . .) or some other parameter. The weight values may be calculated by a skilled operator at a time of setting up the system, or during a subsequent inspection, or they may be derived automatically and may change according to measurements made by the system itself in response to changing conditions on the distribution network.

A reason for using the weighting is to target injected power on the busbar towards a particular one of the power lines. Sequence controller 82 is part of the base station and determines the sequence in which communications stations (TRX at S1, S2 . . .) are polled. The sequence controller controls operation of the transmitter TX and receiver RX parts of the base station and also issues a control signal, with this timing information, to weight controller 80. The weight control signals 75 can thus be changed in synchronism with the subscriber that is being communicated with in order to target injected power at busbar array 25 along a particular line, e.g. to maximise power along line 40 to which subscriber S1 is located at the time that the base station is communicating with S1.

For packet data or time division duplex (TDD) communications where the same frequency band is used for both directions of communication conditions should be reciprocal such that the same weight set can be used for both directions of communication. This allows an optimum weight value to be calculated based on an upstream (base station receiving) communication flow and to use that same weight value on the downstream flow. The weight value can be calculated using a received signal strength indication (RSSI) from the receiver RX, as shown in FIG. 5, or from some other indication of quality of the communications path such as bit error rate. An optimum weight value can be derived by applying changes or perturbations to the weight value and monitoring the effect that this has on the monitored parameter. Weights typically have in-phase (I) and quadrature (Q) components which can be individually varied in turn to derive the optimum weight value. The weight value can be derived during a continuous transmission from a subscriber station, such as a test transmission initiated by the base station.

It is possible to use the same weighting value for every subscriber on a particular power line (40, 41 . . .) or an individual weighting value can be derived for each subscriber on the line. By deriving a weight value for each subscriber it is possible to account for the distance of the subscriber along the line, and to transmit at a higher or lower power level by varying the amplitude of the weight values in one or both paths.

Figure 6:
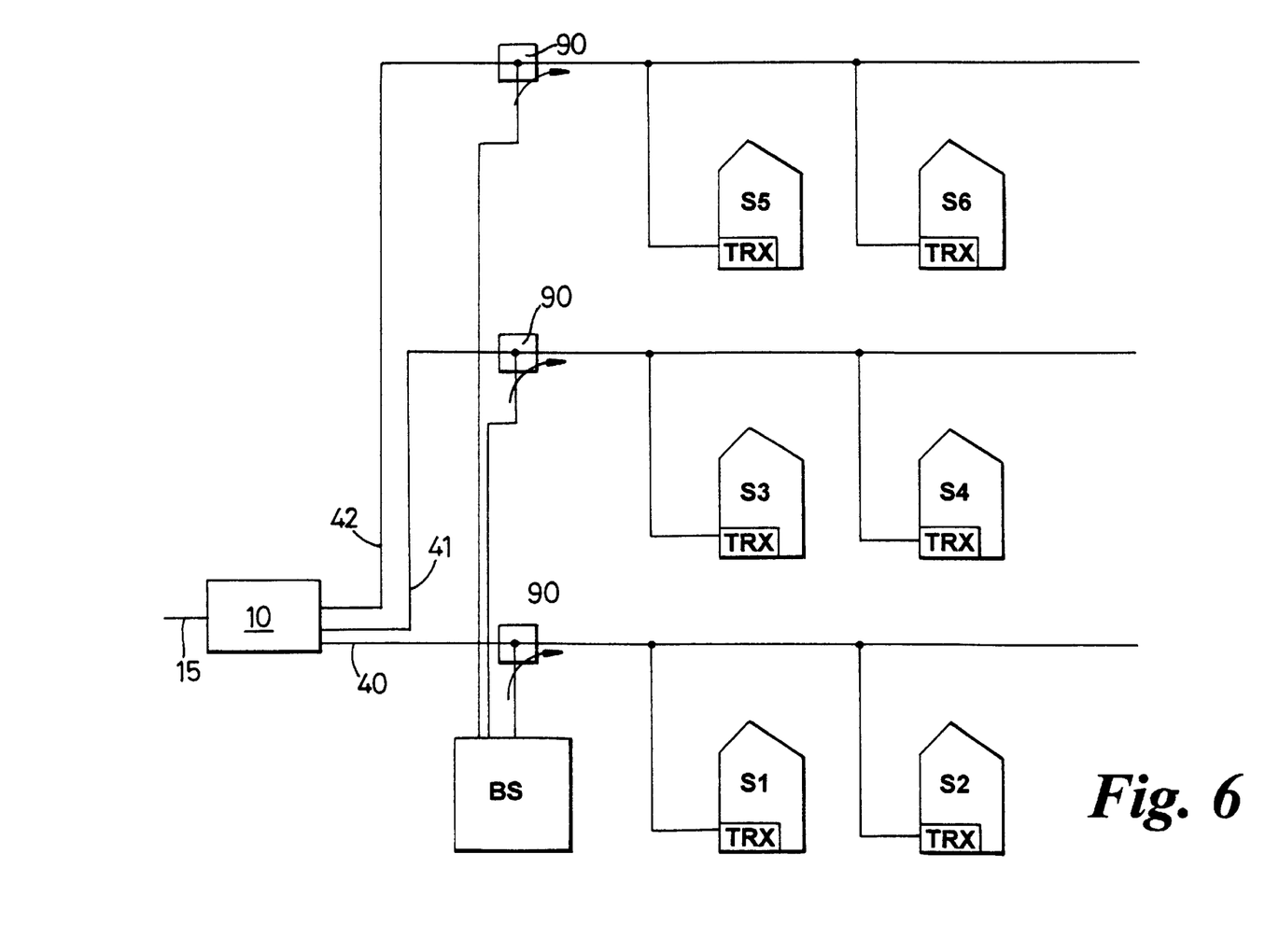
FIG. 6 shows a power line communications network having a base station coupled to a plurality of power lines.

FIG. 6 shows an alternative way in which a base station BS can serve a plurality of power lines 40, 41, 42. The base station BS separately connects to each of the lines using a coupling unit 90 that passes communications signals and blocks the flow of mains electricity. The base station is operated so that, at a particular point in time, communications signals are applied to or received from only the one of the lines (40, 41, 42) that the subscriber is connected to. For example, during the time that the base station communicates with S1, signals are applied to line 40, and during the time that the base station communicates with S3 signals are only applied to/received from line 41.

Figure 7:
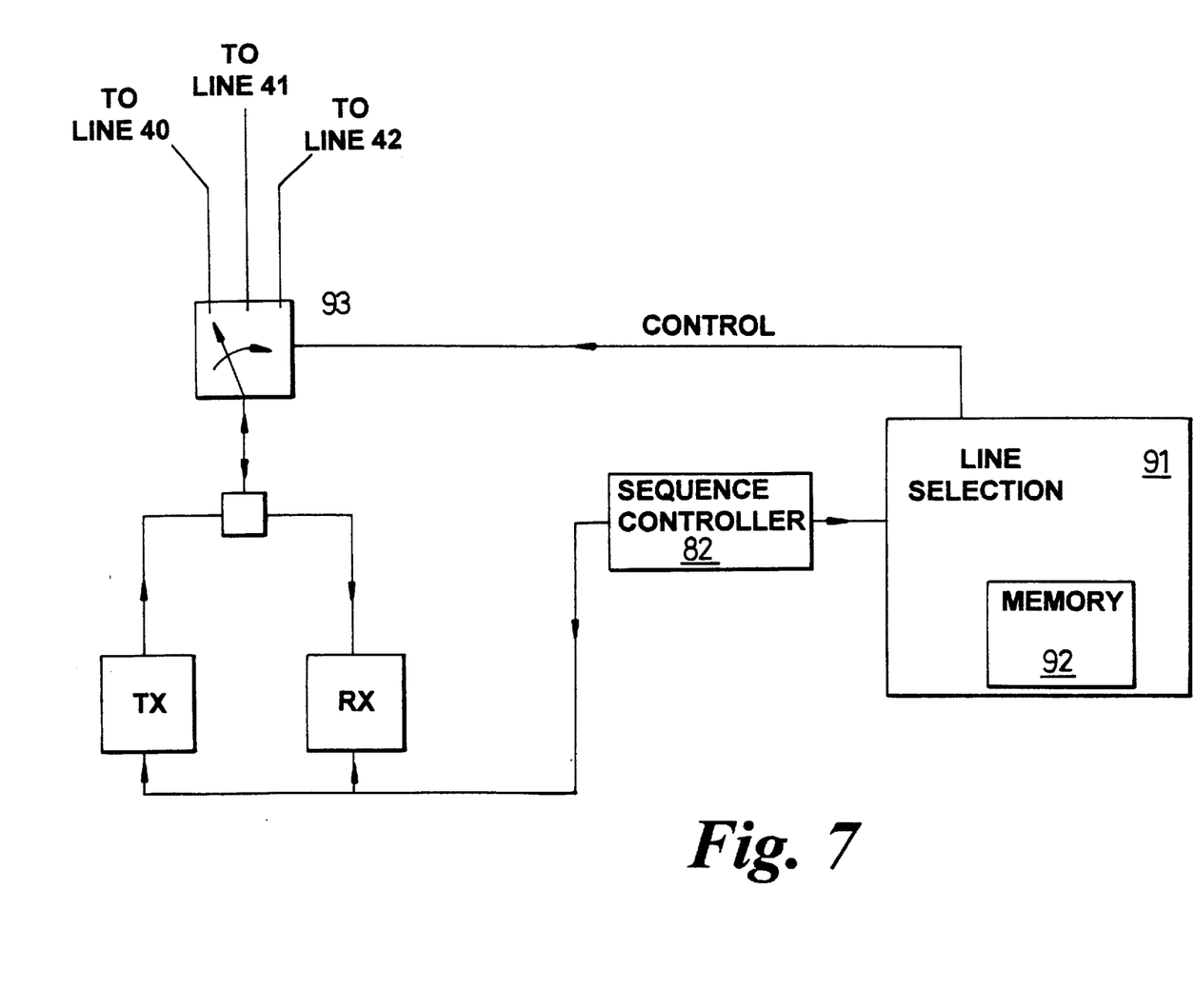
FIG. 7 shows a way of operating the arrangement of FIG. 6.

FIG. 7 shows one way of achieving the selection. Base station BS includes a transmitter TX and receiver RX that are connected to a selection switch 93. The output of switch 93 is a set of cables leading to power lines 40, 41, 42. Sequence controller 82 is part of the base station and determines the sequence in which communications stations (TRX at S1, S2 . . .) are polled. The sequence controller controls operation of the transmitter TX and receiver RX parts of the base station and also issues a control signal, with this timing information, to line selection unit 91. The selection unit 91 has an associated memory 92 with a look-up table of details of subscribers and the corresponding power line to which they are coupled. The switch can thus be changed in synchronism with the subscriber that is being communicated with in order to target injected power along a particular line, e.g. to maximise power along line 40 to which subscriber S1 is located at the time that the base station is communicating with S1.

Applicant's co-pending International Patent Application no. PCT/GB97/02028 describes a technique whereby the direction of propagation of communications signals along a power line is controlled. This is achieved by coupling a wanted communications signal onto the line at a first position, and coupling a second, cancelling signal, onto the line at a second position, spaced from the first position such that the wanted signal and the cancelling signal destructively combine in a single direction of propagation along the line. The cancelling signal is preferably a phase-shifted version of the wanted signal which is derived from the wanted signal.

This technique allows a base station BS to couple communications signals onto a distribution cable and control propagation such that communications signals propagate only in the direction towards subscribers, and not towards substation 10. This reduces radiation from the substation 10.

One problem with injecting RF signals at busbars is unwanted radiation of RF energy from the busbars and other parts of the electricity distribution network. In some trials of equipment that applies communications signals to power lines in an in-phase relationship, transmit power has been limited to 50 mW, this figure corresponding to government regulations for spurious, i.e. out-of-band radiated RF power from radio transmitters.

Figure 8:
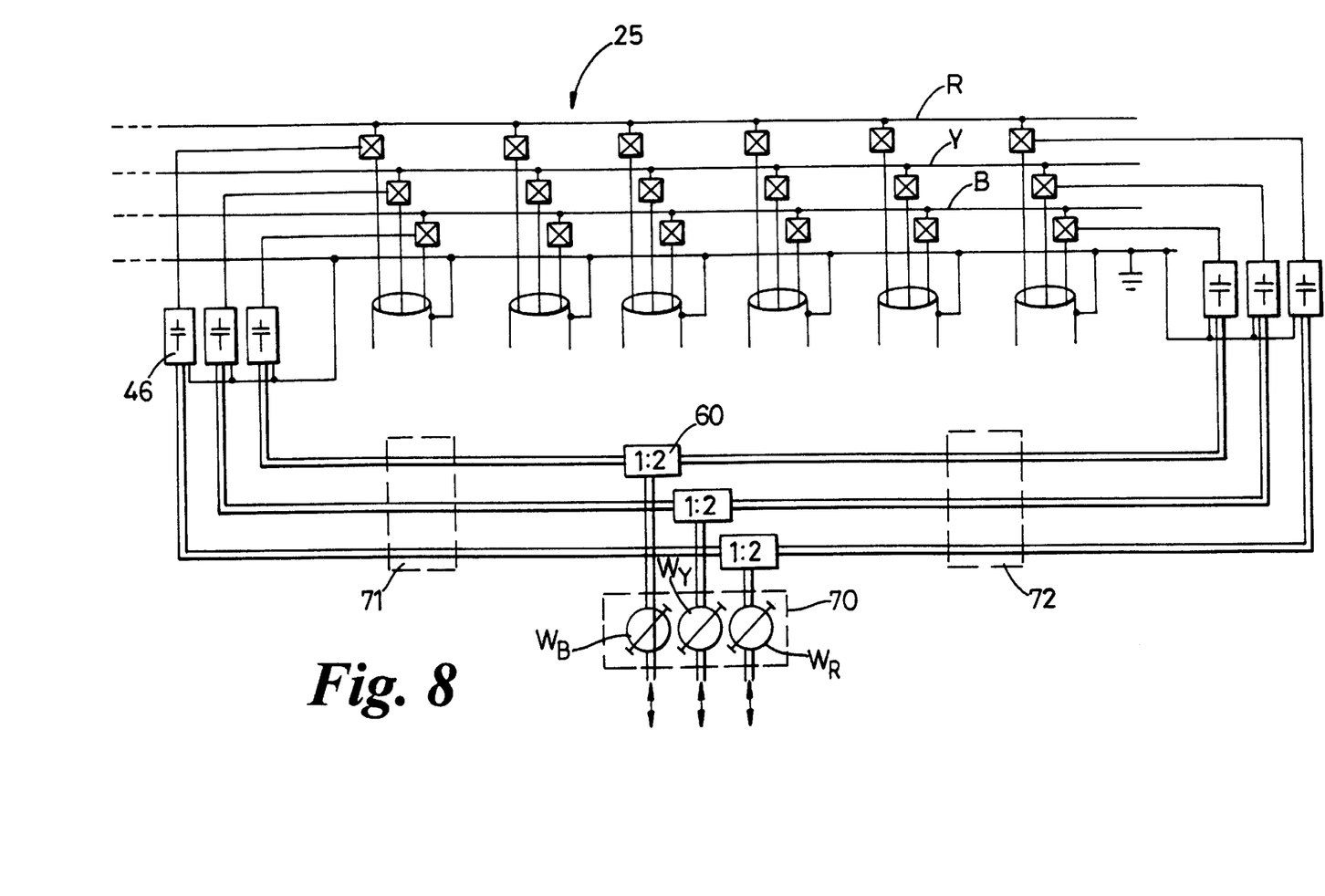
FIG. 8 shows the arrangement of FIG. 3 with the addition of control of the signals fed to each phase line.

FIG. 8 shows a further modification where the set of communications signals that are applied to the busbars (one signal per busbar phase line) have a phasor relationship that minimises radiation. This can allow a 10 to 20 dB increase in transmit power while still maintaining radiated power from a line within regulated limits. A further set of weights 70 are inserted in the lines that feed communications signals from the base station. These weights could alternatively be positioned at points 71, 72.

The following description relates to the operation of this radiation-reducing technique.

Figure 9:
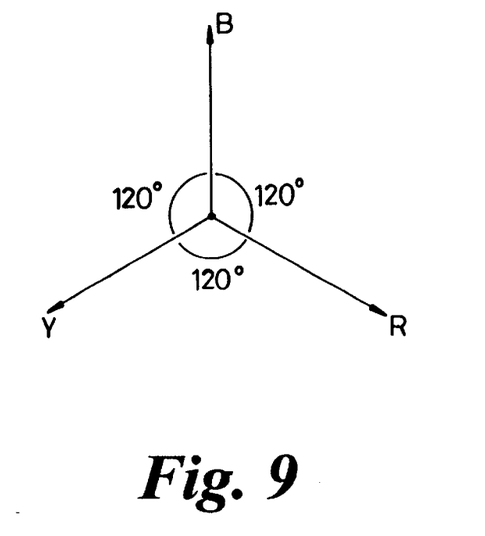
FIG. 9 shows the phasor relationship for a set of three communications signals.

As the power level at which base station BS transmits is increased, the amount of radiation emitted by the distribution network also increases. By applying the communications signals to the phase lines of the distribution network such that they vectorially sum to zero, it is possible to minimise the amount of radiation from the network, and therefore transmit at a higher power level. This allows a base station to serve subscribers located at a greater distance from the station than would have been possible without this arrangement while still maintaining radiated power within acceptable limits. FIG. 9 shows a phasor diagram which illustrates the phasor relationship between three communication signals, one for each of the phase lines B, R, Y. The set of communications signals are offset from one another by 120°. This phasor relationship should apply to all frequency components which form each of the communications signals. As an example, where each communications signal comprises two sine wave components at different frequencies, the phasor relationship between the set of such communications signals should maintain a 120° phase-shift between both frequency components of the signals. Applying the communications signals to the network with this relationship means that radiation from the lines, when viewed in the far-field is minimised. This can be applied more generally to situations where n communications signals are applied to n phase lines, the communications signals being offset from one another by 360°/n. All or only some of the phase lines in the power line may carry communications signals.

Figure 10:
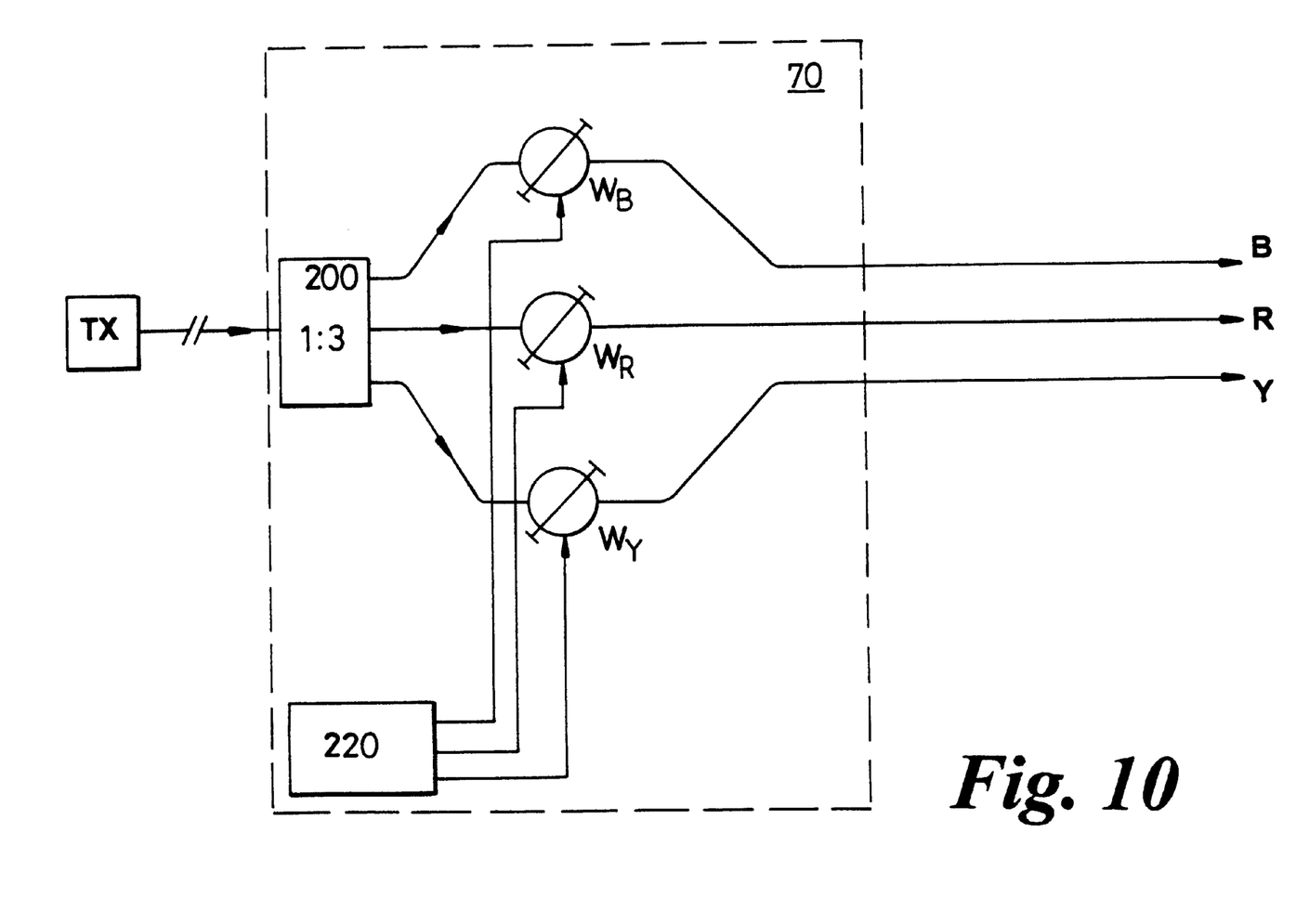
FIG. 10 shows a first arrangement for applying a set of communications signals to a power line with a phasor relationship.

FIG. 10 shows one arrangement which can be used at base station (BS) for applying communications signals to the power line with a phasor relationship. Transmitter TX outputs a modulated communications signal upon a RF carrier. This is divided by splitter 200 into three branches, one for each of the three phase lines.

Each branch includes a weighting device $W_B$, $W_R$, $W_Y$ which can phase-shift a signal at RF. The devices should be capable of applying a constant phase-shift across all frequency components within the bandwidth occupied by the communications signal. Operation of the weighting devices is controlled by a control unit 220. This controls the magnitude of the phase shift which each device provides. The weighting devices may also be arranged to scale the signals in amplitude. The result of this process is that the power line carries a set of signals having the same information content but which are shifted in phase and scaled in amplitude with respect to one another to minimise radiation from the line.

Figure 11:
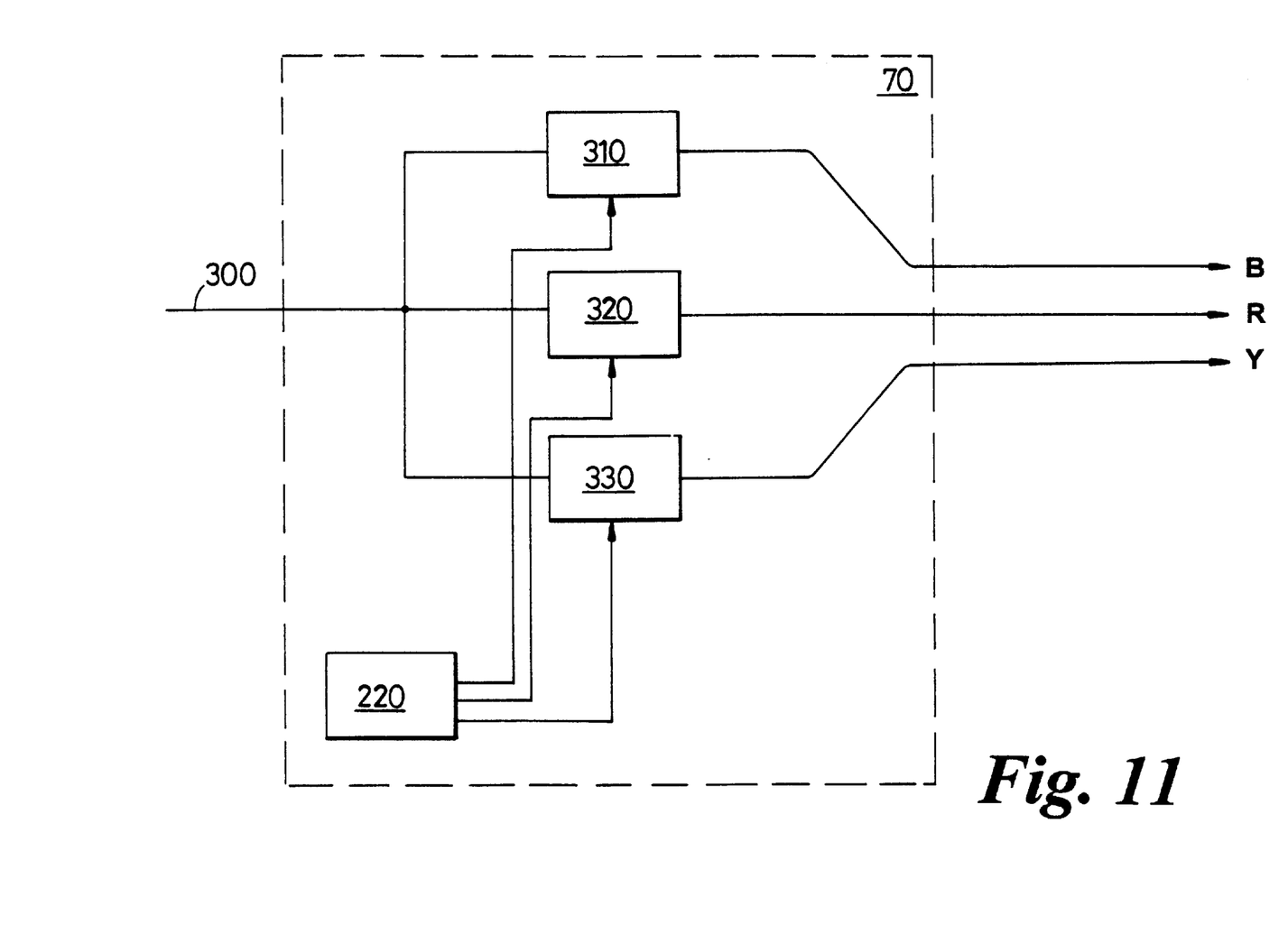
FIG. 11 shows a second arrangement for applying a set of communications signals to a power line with a phasor relationship.

FIG. 11 shows an alternative way of applying communications signals to the power line with a phasor relationship. Input 300 receives a communications signal at base band. This is fed to signal generating devices 310, 320, 330. The signal generating devices generate an RF signal having a particular phase and amplitude. The generated signal is preferably generated in a modulated form according to incoming data from input 300. For example, where modulation is by frequency shift keying (FSK), a carrier at a particular frequency representative of a particular data level '00', '01' etc. is generated. This technique is often called direct digital synthesis (DDS) as the signal is typically generated by retrieving a stored digital representation of the signal from an electronic memory and converting it to analogue form. Operation of the generating devices 310, 320, 330 is controlled by control unit 220 which controls the phase and amplitude of the generated signals. The result of this process is that the power line carries a set of signals having the same information content but which are shifted in phase and scaled in amplitude with respect to one another to minimise radiation from the line.

Figure 12:
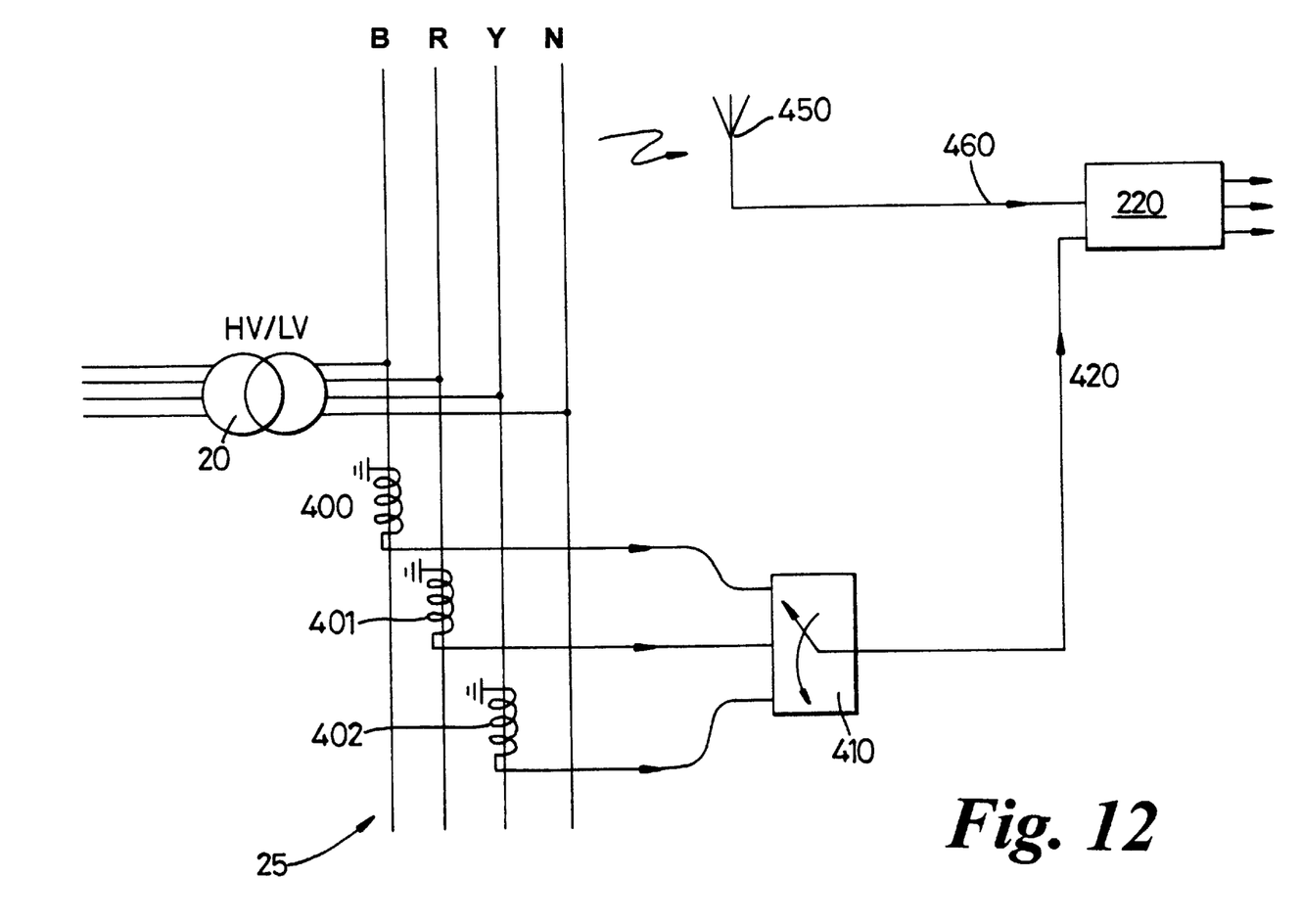
FIG. 12 shows arrangements for monitoring effectiveness of the arrangements of FIGS. 10 and 11.

The phasor relationship of the communications signals which is required to minimise radiation from the line should remain fairly static. For example, where three communications signals are applied to three lines, the three signals should be offset from one another by 120°. However, varying conditions on the electricity network can require a different phasor relationship for the communications signals to ensure that radiation is minimised. Differential electrical loading of the phase lines is one such condition. FIG. 12 shows two ways of monitoring the network to ensure that an optimum phase relationship is established for the communications signals.

The upper part of FIG. 12 shows an antenna 450 located in the far-field of busbars 25. This senses radiation from the busbars and feeds a signal 460 to controller 220 for adjusting values of the weighting or signal generating devices at base station BS. Antenna 450 should be located near the busbars, or some other point of the network which requires monitoring, so as to sense the combined effect of the radiations from the lines rather than the individual contributions of a particular line.

The lower part of FIG. 12 shows an alternative arrangement for determining the effectiveness of the phasor relationship. Sensing coils 400, 401, 402 are arranged one per phase line to detect signals present on respective busbars B, R, Y. The coils can conveniently be inductive coils which are wound around the busbar or laid closely adjacent to it. Sensing is also possible by a capacitive link or by one or more antennas located close to the busbars. Outputs of the sensing coils are either fed directly to control unit 220 or are conveyed, one at a time, by switch 410 to control unit 220 in a multiplex fashion. Sensing coils 400, 401, 402 or equivalent devices provide an indication of loading of each of the phase lines. As described above, differential loading of the phase lines requires adjustment to the phasor relationship of the communications signals applied to those phase lines.

Figure 13:
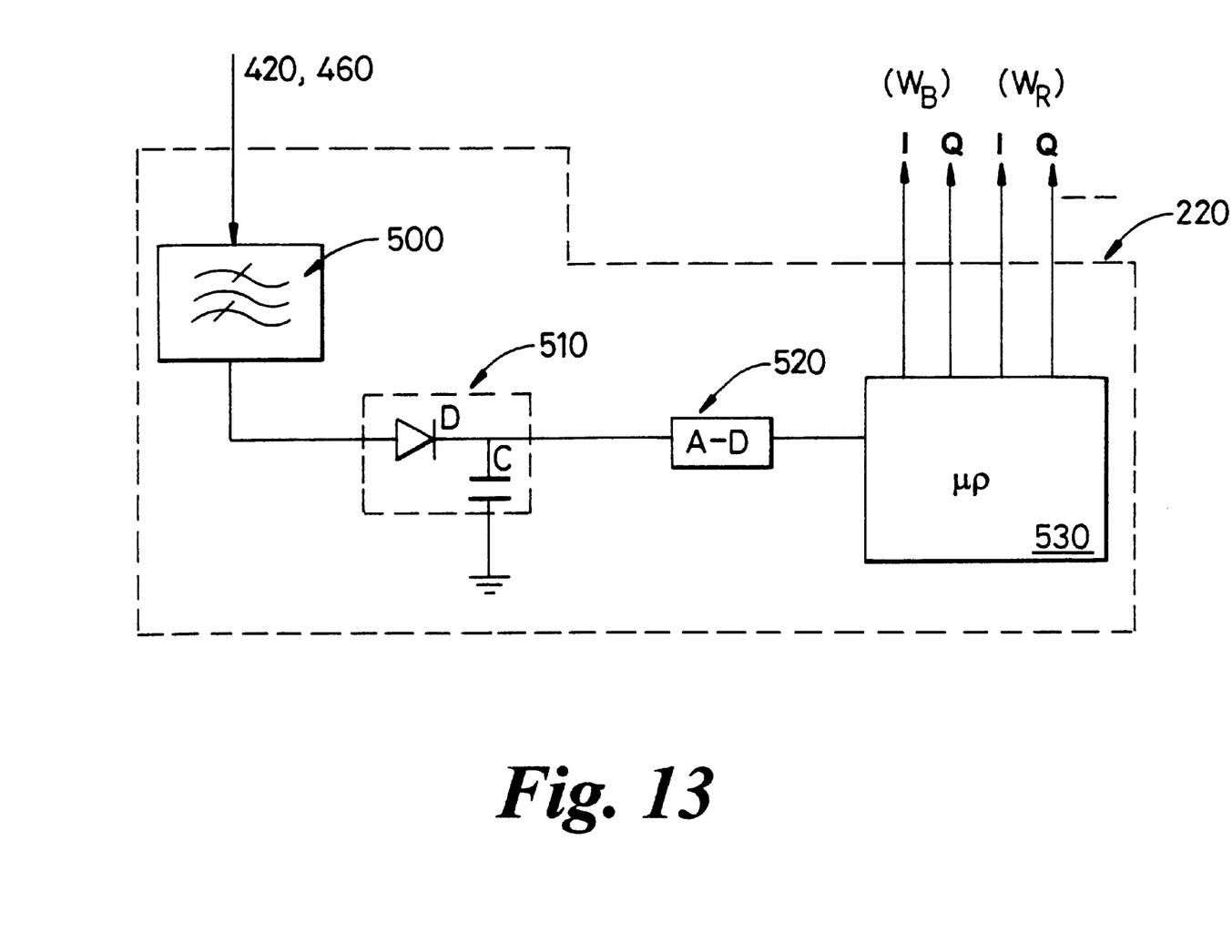
FIG. 13 shows an example of a control unit for use with the arrangements of FIGS. 10 and 11.

FIG. 13 shows an example of the control unit 220. A monitoring signal 420, 460 is applied to a channel filter 500 which passes only those frequencies which are of interest. A power detector 510, shown simply as a diode detector D and capacitor C provide a power measurement which is applied to an analogue-to-digital converter 520. The output of the A-to-D converter is fed to a microprocessor 530 which performs an adjustment of the control signals which are fed to the weighting devices or signal generating devices which establish the phasor relationship of the communications signals. FIG. 13 shows microprocessor 520 outputting two sets of weight control signals for weights $W_B$, $W_R$. A weight can conveniently be controlled by an in-phase (I) and quadrature (Q) control signal. Microprocessor 530 can perform a perturbation process which works by applying steps in the size of the I and Q weight values and monitoring the success of the changes. The algorithm can work by successively changing I up, I down, Q up, Q down. After these four steps have been performed, the change in I or Q which had the best effect is adopted. The process continues until the best cancellation effect is achieved.

It is also possible to vary the control signals by performing a correlation technique.

We claim:

1. Apparatus for transmitting communications signals over a power distribution network comprising a substation having a plurality of power lines leading from it for distributing electricity, and a plurality of communications stations coupled to respective power lines, there also being a base station for serving the plurality of communications stations on the lines, the apparatus comprising:
   means for coupling communications signals between the base station and the distribution network, and
   means for controlling flow of the communications signals according to the station that it is desired to communicate with by preferentially coupling with a power line to which the desired communications station is coupled.

2. A method of transmitting communications signals over a power distribution network comprising a distribution station having a plurality of power lines leading from it for distributing electricity, and a plurality of communications stations coupled to respective power lines, there also being a base station for serving the plurality of communications stations, the method comprising:
   coupling communications signals between the base station and the distribution network, and
   controlling flow of the communications signals according to the station that it is desired to communicate with by preferentially coupling with a power line to which the desired communications station is coupled.

3. A method according to claim 2 wherein each of the power lines has means for coupling communications signals onto the line and the step of controlling flow of communications signals comprises selecting which of the coupling means are used.

4. A method according to claim 3 wherein an input/output of the base station has a path to each coupling means and the step of selecting comprises switching one of the paths to the input/output.

5. A method according to claim 3 further comprising:
   coupling the communications signals onto the preferred line at a first position;
   coupling a cancelling signal onto the conductor at a second position, spaced from the first position;
such that the communications signal and the cancelling signal are arranged to destructively combine in a single direction of propagation along the line while enabling propagation of the communications signal along the line in the other direction towards the desired station.

6. A method according to claim 2 comprising coupling communications signals onto the network at busbars of the distribution station at first and second spaced apart points on the busbars and modifying the signals that are applied to one of the points on the conductor with respect to the signals that are applied to the other point whereby to control the combined power that is delivered to the lines, and controlling the modifying so as to preferentially transmit along/receive from a power line to which the desired station is located.

7. A method according to claim 6 wherein the modifying comprises a phase-shift.

8. A method according to claim 6 wherein the modifying comprises a scale in amplitude.

9. A method according to claim 7 wherein the modifying also comprises a scale in amplitude.

10. A method according to claim 2 wherein each power line has a plurality of phase lines, the method comprising:

coupling a set of communications signals to a set of the plurality of phase lines, each signal being coupled to a respective one of the set of phase lines; and, setting the phasor relationship of the set of communications signals such that radiation of communications signals from the phase lines is minimised.

11. A method according to claim 7 wherein the phasor relationship of the communications signals is arranged such that the vectorial sum of the set of communications signals is substantially equal to zero.

* * * * *